United States Patent
Vastola et al.

(10) Patent No.: US 6,883,937 B2
(45) Date of Patent: Apr. 26, 2005

(54) SEQUENTIAL COLOR RECAPTURE LIGHT SYSTEM

(75) Inventors: George B. Vastola, Santa Rosa, CA (US); Donald L. Dunning, Santa Rosa, CA (US); Eric M. Thomas, San Jose, CA (US); Brian Dresser, Santa Rosa, CA (US)

(73) Assignee: JDS Uniphase Corporation, San Jose, CA (US)

( * ) Notice: Subject to any disclaimer, the term of this patent is extended or adjusted under 35 U.S.C. 154(b) by 77 days.

(21) Appl. No.: 10/644,279

(22) Filed: Aug. 19, 2003

(65) Prior Publication Data

US 2004/0062043 A1 Apr. 1, 2004

Related U.S. Application Data

(60) Provisional application No. 60/405,671, filed on Aug. 23, 2002.

(51) Int. Cl.[7] .................................................. F21V 9/10
(52) U.S. Cl. ........................ 362/293; 362/583; 362/568
(58) Field of Search ................................. 362/293, 568, 362/583; 359/892, 889, 891; 353/84, 100, 101, 121

(56) References Cited

U.S. PATENT DOCUMENTS 6,702,446 B1 * 3/2004 De Vaan et al. .............. 353/84
6,812,979 B1 * 11/2004 Um ............................. 349/106

* cited by examiner

Primary Examiner—Sandra O'Shea
Assistant Examiner—Mark Tsidulko
(74) Attorney, Agent, or Firm—Allen, Dyer, Doppelt, Milbrath & Gilchrist, P.A.

(57) ABSTRACT

A light integrator is mounted in a housing or cover that allows aligning the light integrator relative to a color wheel or other sequential color element. In some embodiments, a plate is attached to one end of a light rod and supports the light rod in the cover in a cantilever fashion or in combination with other support. The light rod is aligned to a light source, such as a lamp, and then the color wheel is aligned to the output of the light rod without altering the relationship between the light rod and the lamp.

26 Claims, 5 Drawing Sheets

US 6,883,937 B2

SEQUENTIAL COLOR RECAPTURE LIGHT SYSTEM

CROSS-REFERENCE TO RELATED APPLICATIONS

This patent application claims priority from U.S. Provisional Patent Application Ser. No. 60/405,671, filed Aug. 23, 2002 by George B. Vastola, Eric Thomas, and Brian Dresser the disclosure, of which is hereby incorporated in its entirety for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates generally to sequential color recapture ("SCR") light systems, and more particularly to techniques for mounting and aligning a light integrator with respect to a color wheel.

BACKGROUND

Light integrators are generally used in applications where it is desired to direct light from a relatively small source to a larger field of uniform illumination. A light integrator, such as a glass or plastic light rod or a mirrored light tunnel, is commonly used for homogenizing the output of a lamp in a projection display system to provide uniform illumination to a spatial light modulator(s) ("SLM"). One type of SLM, commonly known as a digital light processor or ("DLP"), uses an array of electronic micromirrors to direct light from the light integrator to a display screen of a display system. Some display systems use a scrolling color wheel between the output of the light integrator and DLP to scroll bands of color across the DLP. The scrolling color bands are synchronized with the electronic control signals provided to the DLP to create a full-color image on the display screen. The rate of scrolling is sufficiently high that the viewer sees a full-color image, and the color scrolling is not noticeable.

Proper alignment of the light integrator to the light source and alignment of the light integrator to the color wheel and SLM is important for generating a high-quality image. The light integrator typically has a clear aperture in the input face, which is otherwise reflective. Light from the lamp is focused to enter the light integrator through the aperture, where it reflects off the walls of the light integrator and leaves the light integrator as a light beam, which is aligned to the color wheel. Such alignment has typically been done using an optical bench; however, it is desirable to align the optical components in a display system, i.e. a ready-to-use display product shipped to a consumer.

When a solid light rod is used as the light integrator, the multiple reflections off the wall generally occur according to the principle of total internal reflection ("TIR"). Touching the wall of a light rod often disrupts the TIR at the point of contact. In some instances, considerable heat can escape from the light rod and cause localized heating. Touching the wall of the light rod can also create an optical artifact that degrades the homogeneity of the light beam exiting the light rod.

BRIEF SUMMARY OF THE INVENTION

A scrolling color recapture light system has a light integrator mount with a light integrator inside a cover. A scrolling color wheel motor is adjustably attached to the light integrator mount and is alignable in both the vertical and horizontal directions relative to the output face of the light integrator. The light integrator mount allows alignment of the light integrator to a lamp or other light source, and the position of the motor, and hence the color wheel, is then adjusted to the output face of the light integrator to achieve proper scrolling of the colors.

In one embodiment, a light integrator assembly includes a cover extending over a light integrator rod. A plate, such as an aperture plate, is attached to one end of the light integrator rod and supported by the cover, the light integrator rod extending from the aperture plate. The plate seals the end of the light integrator rod with the cover to protect the walls of the light integrator rod from dust. An optional second support mechanism supports the light integrator rod in the cover. In one embodiment, the second support mechanism is a second plate or filter on the exit end of the light integrator rod. In another embodiment, the support mechanism includes one or more alignment rods extending through the cover to contact the walls of the light integrator rod. The ends of the alignment rods are countersunk so that the end of the alignment rod makes a circular line-contact with the wall of the light integrator rod. The portion of the light integrator rod extending from the alignment rods is cantilevered, which avoids contact with the walls of the light integrator rod in the cantilevered portion.

An optional cone on the end of the cover can be sealed with a filter to keep dust off the aperture plate. The cone helps to extract heat from the aperture end of the light integrator rod and shields the motor from heat emitted by the lamp.

DESCRIPTION OF THE INVENTION

A light rod is held in an assembly commonly known as a light engine by supporting a slide or filter attached to at least one end of a cantilevered light rod. In some embodiments, an alignment holder contacts surfaces of the light rod less than one-half the distance from the input end of the light rod to the output end of the light rod. In a further embodiment, the light rod is substantially enclosed in a cover or shroud that provides environmental protection, particularly from dust.

I. An Exemplary Scrolling Color Light System

Figure 1A:
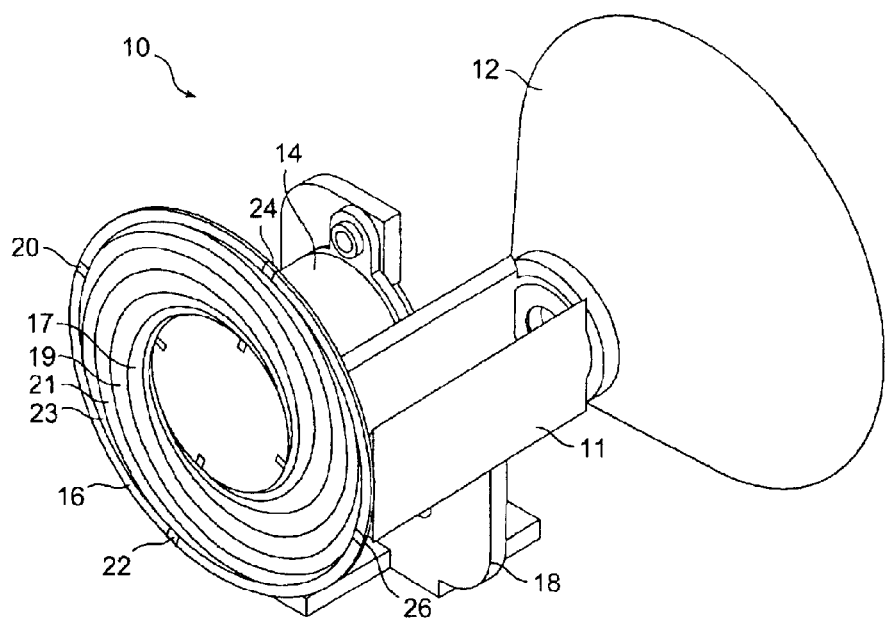
FIG. 1A is a simplified perspective top view of a portion of a scrolling color light assembly according to an embodiment of the present invention.

FIG. 1A is a simplified perspective view of a portion of a scrolling color light assembly 10 according to an embodiment of the present invention. A light rod (not shown) is mounted in an opened cover 11, after which a cover top (not shown) will be attached to protect the light rod from dust and other environmental contaminants. A cone 12 at the input end of the scrolling color light assembly 10 serves several functions. It protects the input face of the light rod or aperture plate from dust, it draws heat away from the input face, which is typically one of the hottest locations of the assembly, and, if of sufficient diameter and proper location, protects a motor 14 of a scrolling color wheel 16 from light and heat emitted by the lamp (not shown). In other words, the funnel acts as a heat shield for the motor. In systems having a cooling fan (not shown), the funnel increases the surface area available for convective cooling.

Lamps used in display systems with scrolling color light assemblies typically have reflectors, such as elliptical, parabolic, or spherical reflectors that direct light generated at a filament or arc toward an aperture in the input end of the rod. The light from the reflector/lamp typically has a cone angle, and the angle of the cone 12 is approximately the same as the angle of light from the lamp, or larger. Thus, in one embodiment the cone angle is chosen according to the lamp reflector and distance from the lamp. In one embodiment, the angle of the cone 12 is about thirty degrees. The cone 12 may be attached to a mount 18 and/or cover 10, or integrated, as by casting or forging these features in a single part. In a particular embodiment, the mounting, cover, and cone are cast from an aluminum alloy as a single piece.

The color wheel 16 has spiral regions of dichroic filters also know as color filter segments, such as red 17, blue 19, and green 21 filters, and timing marks 20, 22, 24, 26 on its perimeter. The color wheel optionally includes a clear region 23. Alternatively, a color wheel has different dichroic filters, such as a cyan filter and a yellow filter. The timing marks are clear portions that are used in conjunction with an optic fiber light source and detector to synchronize the color wheel with the DLP. Other embodiments may not use a color wheel, or might not even relate to a scrolling color system. For example, the funnel and rod-mounting techniques may be used in conjunction with scrolling color systems using fixed dichroic filters and rotating prisms or mirror drums or polarization recovery systems.

Figure 1B:
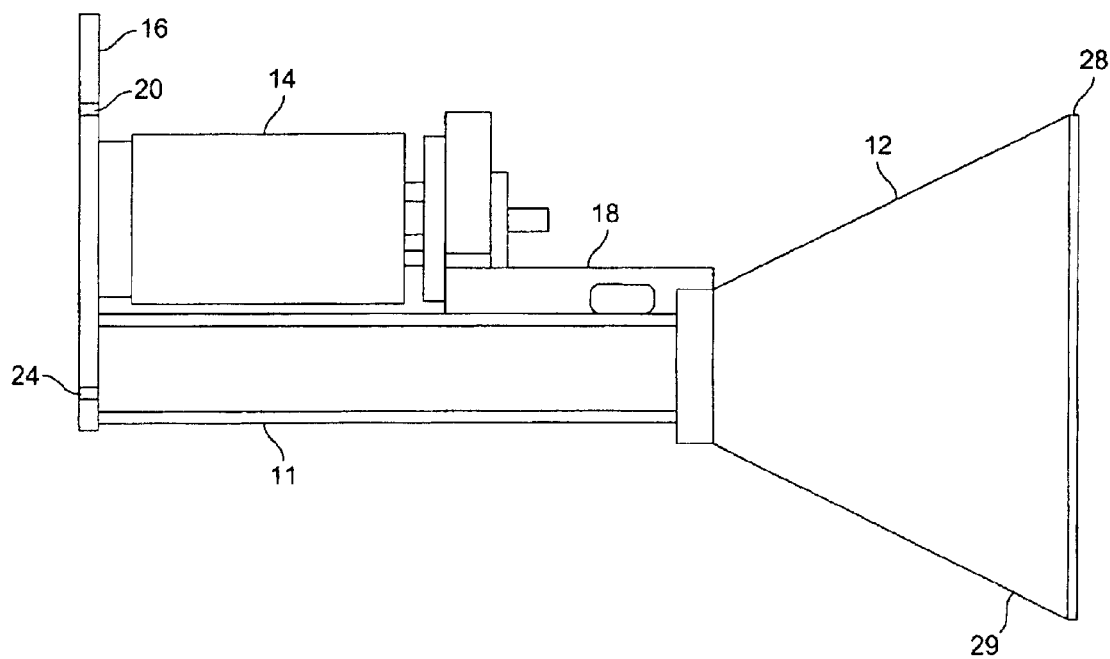
FIG. 1B is a simplified top view of the portion of the scrolling color light assembly shown in FIG. 1A.

FIG. 1B is a simplified top view of the portion of the scrolling color light assembly shown in FIG. 1A. A transparent plate or filter 28 is attached to a wide end 29 of the cone 12, which is integrated with the cover 10 and the mount 18 as a single metal casting. The motor 14 is mounted on the mount 18, and turns the color wheel 16 at a selected rotational speed. Two timing marks 20, 24 are shown on the color wheel. The cone 12 and a plate 28 protect the input face of the light rod (not shown) from dust, and the cover 11 protects the length of the light rod from dust. Dust landing on the input face of the light rod can achieve very high temperatures due to the high flux of light, which can cause an optical defect. Similarly, dust landing on the sides or edges of the light rod can degrade the TIR of the light rod, causing light to "leak" out of the light rod where the dust touches, heating the leakage region and causing a dark spot in the light output. Incorporating a plate or filter 28, such as an ultra-violet ("UV"), infrared ("IR"), and/or anti-reflection ("AR") filter, at the wide end of the cone seals the cone from dust. Of course, a transparent plate with no filtering function also provides dust protection.

It is generally desirable to remove IR and UV energy from a display system, as it may not be necessary for the display and generally causes unwanted heating of the system components. Locating the filter 28 on the wide end of the cone provides a relatively large surface area for the filtering to occur over, thus lowering the flux density compared to locating a similar filter at the narrow end of the cone or at the aperture of the light rod, for example. Thus, such a filter placement achieves dust protection and filtering with a single component.

Figure 1C:
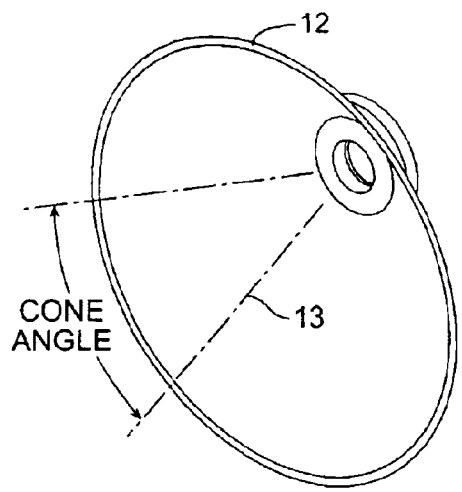
FIG. 1C is a simplified perspective view of a cone according to an embodiment of the present invention illustrating cone angle.

FIG. 1C is a simplified perspective view of the cone 12 illustrating cone angle, which is measured from an optical axis 13 of the scrolling color light assembly.

II. Exemplary Covered Light Rods and Support Techniques

Figure 2A:
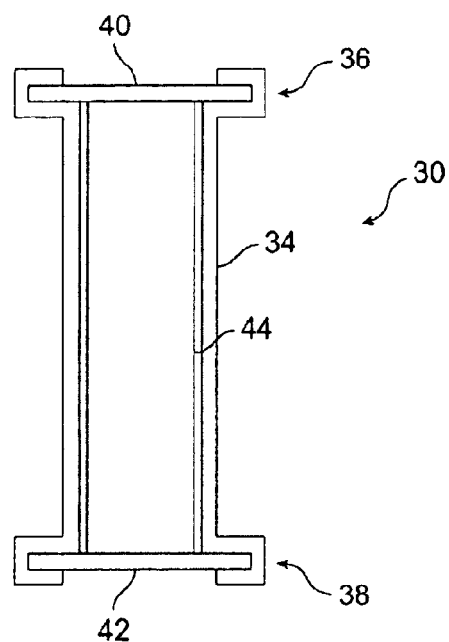
FIG. 2A is a simplified top view of a portion of a light rod assembly according to an embodiment of the invention.

FIG. 2A is a simplified top view of a portion of a light rod assembly 30 according to an embodiment of the invention. Light rods provide several desirable features for integrating light from a lamp source to illuminate a light valve. However, mounting light rods is not a simple matter. The heat and light present in modern display systems is considerable. Light rods are conventionally mounted with eight clips. Each clip contact creates a potential loss site for light to escape from the rod. This can heat up the clip, and can also cause localized heating of the rod. Some rods are coated with low-index material, or are fabricated to have a core and cladding, much like an optic fiber, so that TIR occurs at a solid-phase interface between the rod and outer coating, rather than at the rod-air interface. Such techniques currently add significant cost to the rod element.

A cover 34 (shown without a top) is fabricated with mounting channels 36, 38 for an aperture plate 40 and a front plate 42. The front plate may be a simple sheet of glass, may have an AR coating applied, or may include dichroic filters in a rotating prism or mirror drum scrolling color system. The aperture plate 40 and the front plate 42 are attached to a light rod 44 with optical cement capable of withstanding the operating temperatures generated in the system. Alternatively, the front plate 42 and associated mounting channel 38 are omitted, and the light rod 44 is supported as a cantilever beam from the aperture plate 40.

Adhesives used in such assemblies should be reliable over the operating temperature range of the assembly (e.g. about 120° C.). It is generally desirable that the cement or adhesive not absorb UV light, but some optical cements are believed to include free radicals that are activated by UV light, and are essentially used up in the curing process, so that the subsequent bond does not absorb sufficient light to affect reliability. If an adhesive absorbs UV light, it may be more likely to heat up and fail because of the high flux of light present, even with a UV filter between the lamp arc and the adhesive. Adhesives belonging to the group of acrylates or the group of polysiloxanes are good candidates for this application, such as are available from NUSIL of Carpenteria, Calif. and ABLESTIK of Rancho Dominguez, Calif.

The aperture plate 40 and the front plate 42 are glued into the corresponding mounting channels or slots 36, 38 with an adhesive, such as an epoxy. The temperature of the cover is substantially lower than the temperature attained by the input end of the light rod, especially if a cooling fan is provided, and the adhesive does not have to be an optical adhesive. The aperture plate 40 and front plate 42 cooperate with the cover 34 to keep dust off of the walls of the light rod.

Figure 2B:
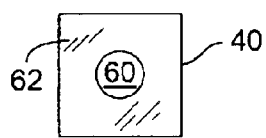
FIG. 2B is a simplified end view of an aperture plate illustrating an aperture in a reflective field.

FIG. 2B is a simplified end view of the aperture plate 40 illustrating an aperture 60 in a reflective field 62. The reflective field 62 may be a metallic film or layer, or a stack of dielectric thin film layers formed on a glass plate or slide. In some embodiments, the reflector and aperture are formed on the end of the light rod, in which case a clear plate may be attached to the end of the light rod for mounting in the cover. The clear plate may be coated with a filter, such as an IR, UV, and/or anti-reflection filter.

Figure 3A:
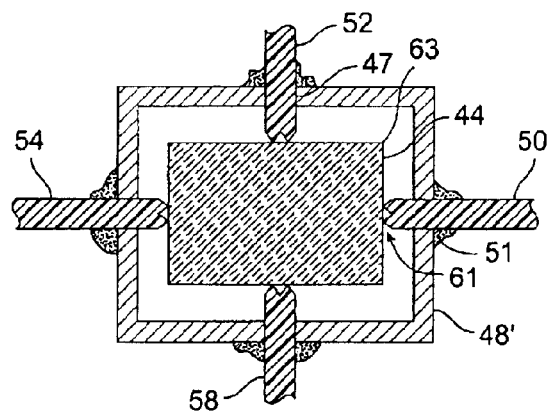
FIG. 3A is a simplified cross section of a light rod held in a cover by alignment rods.

FIG. 3A is a simplified cross section of the light rod 44 held in a cover 48' by alignment rods 50, 52, 54, 58. The alignment rods extend through holes in the cover 48' to contact and support the walls of the light rod 44 at four regions, as opposed to the eight contact regions arising from conventional clip-type rod mountings. The end 61 of the alignment rod 50 contacting the light rod 44 is beveled and countersunk so that the end 61 makes a circular line contact having a selected diameter with the wall of the light rod 44. The circular line contact has relatively little area in contact with the light rod 44, and in a particular embodiment the diameter of the circular line contact is about 2 mm.

After bringing the alignment rod 50 in contact with the light rod 44 and aligning the light rod 44 to the desired optical axis, which is typically the optical axis of light from the lamp reflector, the alignment rod is affixed to the cover 48' with epoxy or other adhesive 51. Alternately, some or all of the alignment rods are press-fit into the cover 48'. Supporting the light rod 44 as shown avoids touching the corners 63 of the light rod, which is particularly desirable because light and heat can build up in the corners, exacerbating any light loss in these regions. The light rods are typically glass or plastic, and it is desirable to avoid scratching the surface of the light rod. In some embodiments, the alignment rods 50, 52, 54, 58 are plastic and their ends deform slightly when the alignment rods are inserted through the holes in the cover 48' to securely hold the light rod 44. NYLON 66™ and TORLON™ are examples of materials that were used to make alignment rods, although other materials are suitable.

Figure 3B:
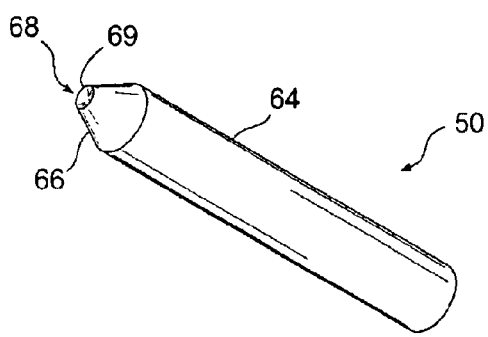
FIG. 3B is a simplified perspective view of an alignment rod.

FIG. 3B is a simplified perspective view of the alignment rod 50. The alignment rod 50 has a cylindrical shaft 64 and a tip that is beveled 66 and countersunk 68, providing a circular line contact 69 to support the light rod (see FIG. 3A, ref. num. 44). Beveling and countersinking the tip of the alignment rod provides a controllable diameter of the line contact and a rod diameter that provides secure mechanical support of the light rod in the cover. In a particular embodiment, a circumference of the line contact of about 0.099 inches±0.5% was found to adequately support the light rod with minimal leakage of light from the contact areas.

Figure 3C:
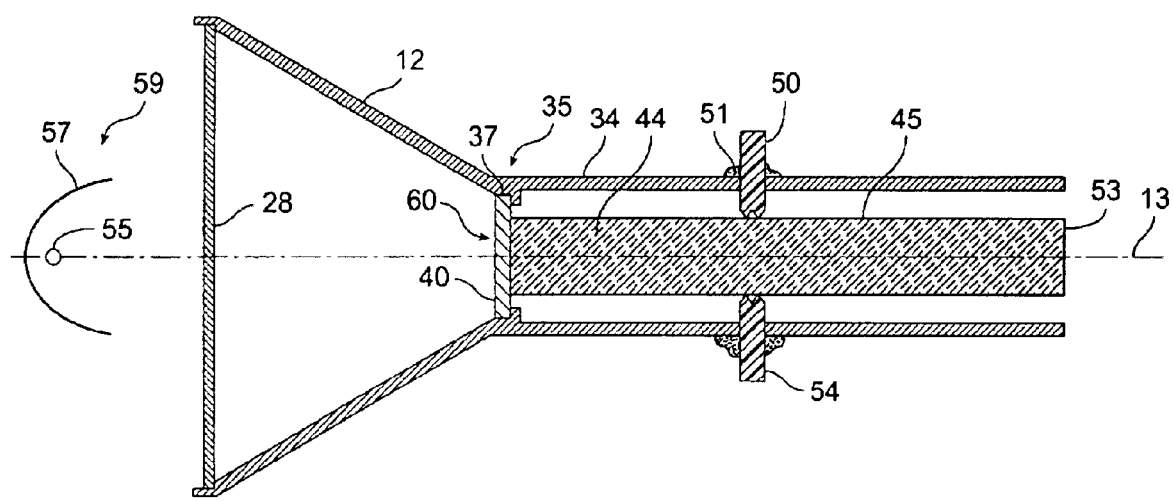
FIG. 3C is a simplified cross section of a light rod held in an assembly that integrates a cone with a cover.

FIG. 3C is a simplified cross section of the light rod 44 held in an assembly 35 that integrates the cone 12 with the cover 34. A lamp 59 including an element 55, such as a filament or arc, and a reflector 57 directs light through the plate 28 into the light rod 44 through the aperture 60. The lamp 59 is not drawn to scale and is shown to illustrate a typical alignment of the assembly 35 along the optical axis 13.

The aperture plate 40 fits in a pocket 37 formed in the assembly 35. The light rod 44 is supported by the aperture plate 40 at one end, and optionally by alignment rods 50, 54. The light rod 44 is aligned to the optical axis 13, which generally runs through the aperture 60 and down the center of the light rod 44. The aperture plate 40 is typically secured in the pocket 37 with adhesive, as are the alignment rods 50, 54, if used. Epoxy adhesive 51 may be filleted around the alignment rods 50, 54. The thickness of the cover is not shown to scale. A thicker wall provides more support for the alignment rods, and may be particularly desirable in embodiments wherein the alignment rods are pressed into the cover without using adhesive. In some embodiments the ends of the alignment rods are essentially flush with the outer surface of the cover.

The alignment rods 50, 54 (including two orthogonal alignment rods not shown in this cross section) are used to align a light rod to the optical axis 13 from the lamp reflector or other light source (not shown). The light rod 44 is supported at its input end by the aperture plate 40, and in a mid-portion by the alignment rods 50, 54 so that a cantilevered portion 45 of the light rod 44 extends from the alignment rods 50, 54, toward an output face 53. Thus, the light rod is securely supported along the desired optical axis while typically over half the light rod is cantilevered without touching other material.

The plate 28 with an optional UV/IR filter is secured to the cone 12 after the aperture plate 40 is fixed in the pocket 37. The plate 28 seals the cone 12 and keeps dust off the aperture plate 40. Similarly, the cover 34 protects the walls of the light rod 44 from dust. The assembly 35 provides secure mechanical support to the light rod 44 with minimal contact the length of the light rod 44. The assembly 35 can also be manipulated to align the light rod 44 to other elements, such as the color wheel, without touching the light rod 44, or altering the relationship between the light rod 44 and the assembly 35.

III. Mounting Structures

Figure 4A:
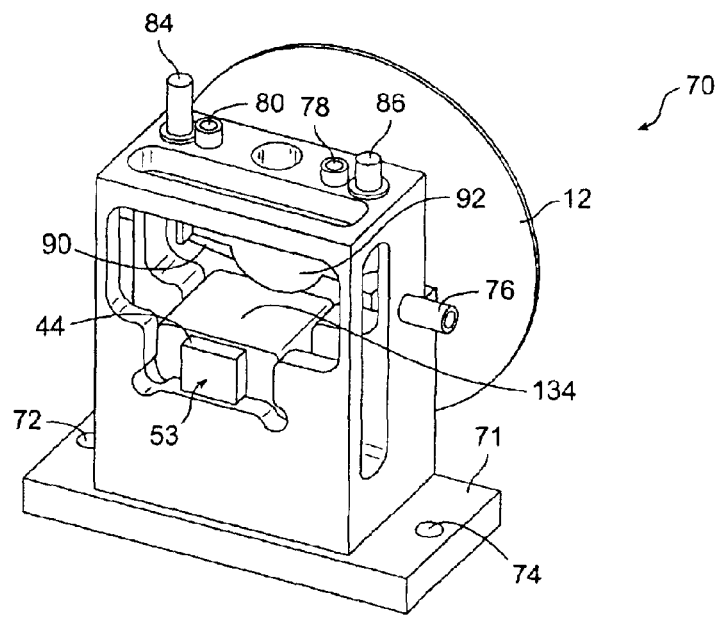
FIG. 4A is a simplified perspective view of a mount assembly according to an embodiment of the present invention.

FIG. 4A is a simplified perspective view of a light rod mount assembly 70 ("mount assembly") according to an embodiment of the present invention for use in a sequential (scrolling) color recapture light system. The motor and color wheel (see, e.g. FIG. 1A, ref. nums. 14, 16) are omitted from FIG. 4A in order to illustrate details of the mount assembly 70 that would otherwise be obscured. A light integrator rod 44 is supported in a cantilever fashion from an aperture plate (see FIG. 3C, ref. num. 40) supported in a pocket (see FIG. 3C, ref. num. 37) of the cone 12. A cover 134 extends along the light integrator rod 44 from the cone 12. A mount 71 is adjustably attached to a projection system (not shown) through mounting holes 72, 74, which allow aligning the light integrator rod 44 to the optical axis of the lamp (see FIG. 3C, ref. nums. 13, 59).

The motor and color wheel are independently alignable to the output face 53 of the light integrator rod 44. Using spring assemblies 76, 78, 80 in conjunction with alignment screws 84, 86 moves a sliding plate (see FIG. 4D, ref. num. 88) along a ramp 90. A back plate 92 of the motor is attached to the sliding plate and moves with the sliding plate as the alignment screws 84, 86 are screwed in and out.

Figure 4B:
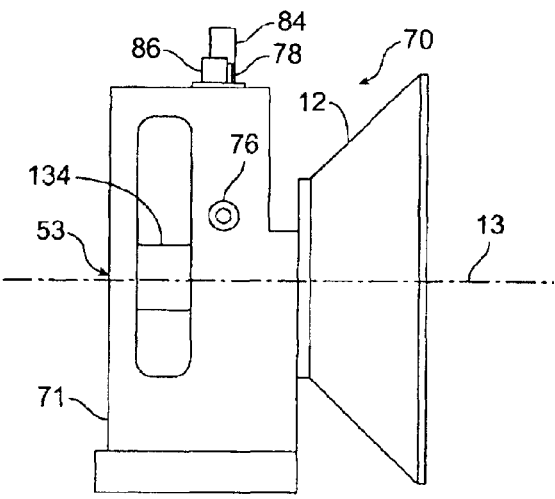
FIG. 4B is a simplified side view of the mount assembly of FIG. 4A.

FIG. 4B is a simplified side view of the mount assembly 70 of FIG. 4A. The cone 12 and cover 134 are formed as a unitary piece from metal, such as aluminum or stainless steel, or plastic, such as polybenzimidazole. Alternatively the cover and cone are formed as separate pieces and joined to the mount 71. The cover 134 and cone 12 are affixed to the mount 71, which is alignable to the optical axis 13.

Alternatively, the cover and cone are adjustably attached to the mount. The spring assemblies 76, 78 and alignment screws 84, 86 enable separate alignment of the color wheel, which is attached to the motor, to the output face 53 of the light integrator rod. Precise alignment of the color wheel to the output face of the light integrator rod is desirable to insure the proper relationship between the scrolling color filters on the color wheel and the output face. In some light systems it is desirable to adjust the color wheel to the light integrator so that the spiral color filters are tangential to an edge of the output face at the center of the edge. An embodiment of the present invention allows adjustment of the motor, and hence color wheel to an accuracy better than 0.01 mm.

Figure 4C:
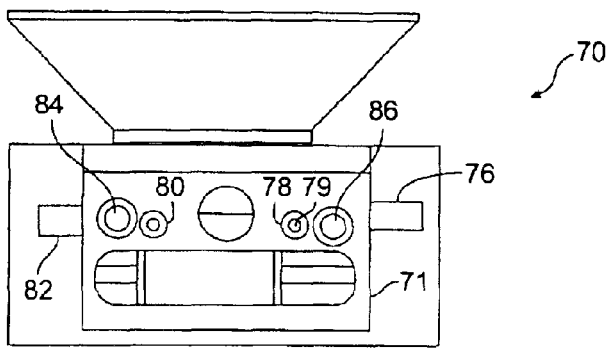
FIG. 4C is a simplified top view of the mount assembly of FIG. 4A.

FIG. 4C is a simplified top view of the mount assembly 70 of FIG. 4A. Four spring assemblies 76, 78, 80, 82 are shown, along with two alignment screws 84, 86. The spring assemblies are pressed or otherwise secured in mount 71. The force supplied by a spring assembly is adjustable, such as with an Allen wrench used in a socket 79 of the spring assembly 78. The spring assemblies are constant-force spring assemblies and are adjusted to provide a consistent "feel" when screwing and unscrewing the alignment screws. In an alternative embodiment, non-constant-force spring assemblies or other devices are used.

Figure 4D:
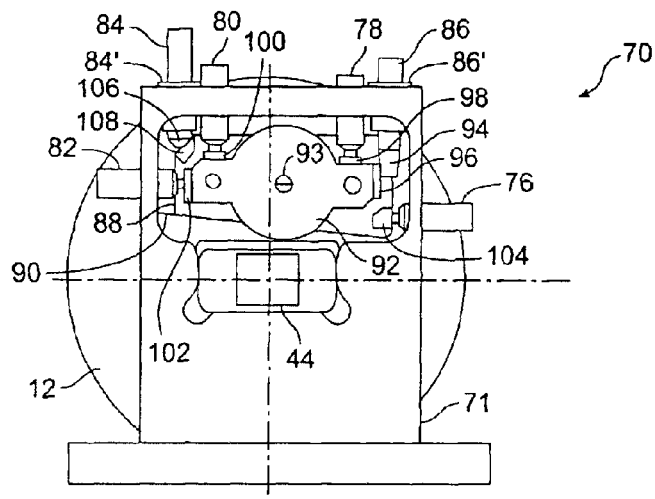
FIG. 4D is a simplified rear view of the mount assembly of FIG. 4A

FIG. 4D is a simplified rear view of the mount assembly 70 of FIG. 4A. Alignment screw 86 is used to adjust the horizontal position of back plate 92. Back plate 92 is typically provided with the motor, the remainder of which is omitted from illustration. The motor is secured to the mount 71 with a motor mounting screw (not shown) that extends through a center hole 93 in the back plate 92 and through a similar hole (not shown) in the sliding plate 88 to the mount 71. In a particular embodiment, a spring washer (not shown) is plated between the head of the motor mounting screw and the mount 71 to securely hold the motor while allowing adjustment of the motor and color wheel with the alignment screws relative to the light integrator rod 44, which is held in mount 71. The tolerance of the motor mounting screw in the respective holes allows sufficient movement to adjust the color wheel. In a particular embodiment, about 1.5 mm of horizontal adjustment and about 1.5 mm of vertical adjustment (of the motor and hence the color wheel) is provided, and the pitch of the adjustment screws 84, 86, angle of the tapered ends (faces) 94, 106, and angle of the ramp 90 are chosen to provide alignment accuracy of less than 0.01 mm over the entire 1.5 mm adjustment range.

The tapered end 94 of the alignment screw 86 contacts a tab 96 of the back plate 92. Spring assemblies 78, 80, 82 provide spring forces against the tabs 98, 100, 102 of the back plate 92. The spring assembly 76 provides a spring force against a tab 104 of the sliding plate 88, and the tapered end 106 of the alignment screw 84 contacts another tab 108 of the sliding plate 88.

When the alignment screw 84 is extended (i.e. screwed "in"), the tapered end 106 presses against the tab 108 and pushes the sliding plate 88 toward the spring assembly 76 along the ramp 90, which is known as a reduction ramp because the vertical movement of the sliding plate is a reduction from the horizontal movement. In an alternative embodiment, a reduction ramp is essentially vertical, or at an arbitrary angle, with suitable re-location of the alignment screws and spring assemblies. Similarly, the spring assemblies may be replaced with other devices, such as elastomeric elements or coil springs in tension, to provide return forces to the back plate 92 and sliding plate 88.

When the alignment screw 84 is retracted, spring assembly 76 pushes against tab 104 on sliding plate 88 to push sliding plate 88 back up ramp 90. Thus, vertical adjustment of the motor and attached color wheel relative to light integrator rod 44 is accomplished. However, as back plate 88 slides along ramp 90, horizontal displacement also occurs.

When alignment screw 86 is extended, tapered face 94 presses against tab 96 to push back plate 92 toward spring assembly 82. Similarly, when alignment screw 86 is retracted, spring assembly 82 pushes against tab 102 on back plate 92 to move back plate 92 in the opposite direction. Thus, alignment screw 86 provides horizontal adjustment of the motor and attached color wheel. Spring assemblies 78, 80 hold sliding plate 88 against ramp 90.

In a particular embodiment, the angles of the ramp 90 and taper ends 106, 94 are selected in accordance with the pitch of alignment screws 84, 86. The alignment screws 84, 86 have 100 threads per inch, corresponding to the threads formed in bosses 84', 86' pressed into mount 71. Ramp 90 has an angle of 5.66 degrees from the horizontal, providing a reduction slope of 10:1. Taper end 94 has a taper angle (i.e. the angle in a plane formed between the taper face and the rotational axis of the alignment screw) equal to the angle of the ramp 90, namely 5.66 degrees. Taper end 106 has a taper angle of 45 degrees. This relationship between the taper ends and the ramp provide an even "feel" when vertically and horizontally aligning the motor and color wheel to the light integrator rod. In other words, a similar amount of travel occurs and a similar amount of tactile feedback is provided when either alignment screw is turned through a similar arc.

Figure 5:
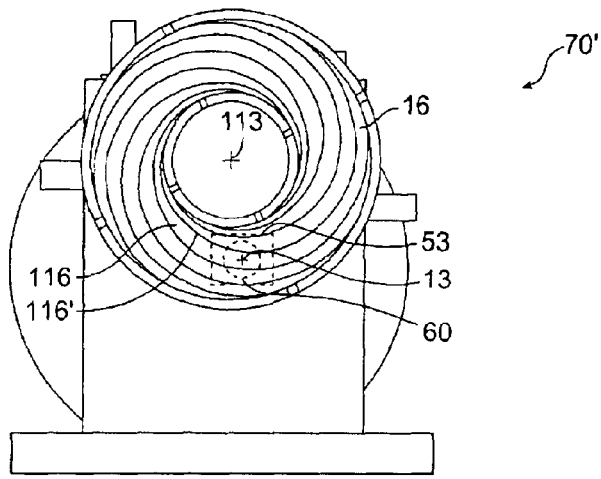
FIG. 5 is a simplified rear view of a color wheel attached to a mount assembly according to an embodiment of the present invention.

FIG. 5 is a simplified rear view of a color wheel 16 attached to a mount assembly 70' according to an embodiment of the present invention. The light integrator rod 44, which is behind the color wheel, is shown in dashed lines, as is the aperture 60. The optical axis 13 of the light integrator rod and a rotational axis 113 of the color wheel/motor are slightly offset, but may be vertically aligned in some embodiments. In a particular embodiment, an edge 116' of a spiral color filter segment 116 (see generally, FIG. 1A, ref. nums. 17, 19, 21, 23) is tangential to the optical axis 13 when it intersects the optical axis 13. Alternatively, the edge of the spiral filter segment is tangential to the upper or lower edge of the output face, or is not tangential to either the optical axis or an edge of the output face.

IV. Exemplary Alignment Methods

Figure 6:
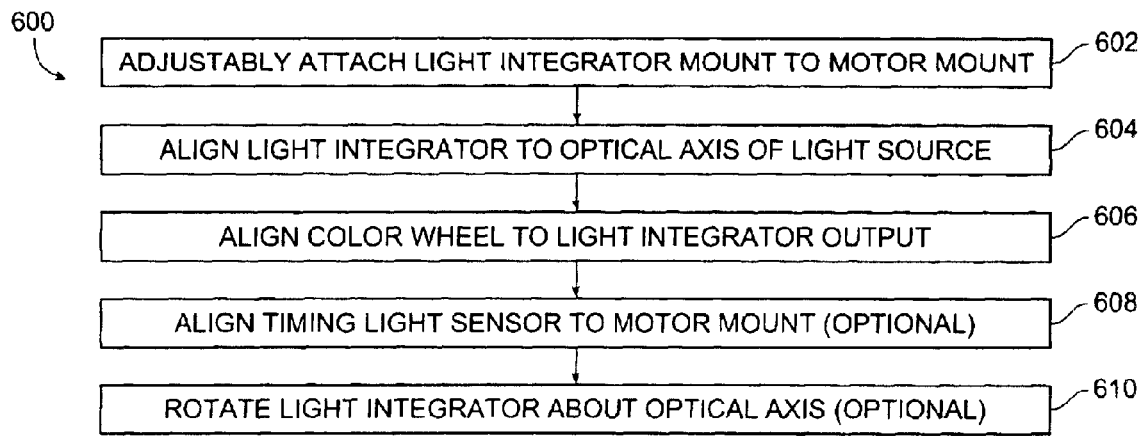
FIG. 6 is a simplified flow chart of a method of aligning a scrolling color light system according to an embodiment of the present invention.

FIG. 6 is a simplified flow chart of a method 600 of aligning a scrolling color light system according to an embodiment of the present invention. A motor including a color wheel is adjustably mounted on a mount assembly (step 602) of a display system. A light integrator rod is held in a cover attached to the light integrator mount, allowing the light integrator rod to be aligned by manipulating the mount assembly. Alternatively, the cover and light integrator rod are adjustably coupled to the mount assembly. The light integrator rod is aligned to an optical axis of a light source (step 604), and fixed in place. The color wheel is aligned to an output face of the light integrator rod (step 606) by adjusting the position of the motor and color wheel relative to the face of the light integrator rod without changing the alignment of the light integrator rod with respect to the optical axis of the light source. In an alternative embodiment, the color wheel is aligned to the output face of the light integrator rod, and then the light integrator rod is aligned to the optical axis of the light source.

In a further embodiment, a timing light sensor adjustably attached to the motor mount is aligned to a timing mark on the color wheel (step 608). In a particular embodiment, the timing light sensor is aligned to the timing mark and secured to the motor mount before the color wheel is aligned to the output face of the light rod (step 606) so that the relationship between the timing light sensor and the color wheel does not change as the color wheel is aligned to the light rod.

In another embodiment, the light rod is provided in a rotatable housing that allows rotation of the light rod or other light integrator about the optical axis of the light source. The light integrator is rotated (step 610) to rotate the footprint of the light beam output from the light integrator.

While the preferred embodiments of the present invention have been illustrated in detail, it should be apparent that modifications and adaptations to these embodiments may occur to one skilled in the art without departing from the scope of the present invention as set forth in the following claims.

We claim:

1. A mount assembly comprising:
   a mount;
   a motor movably attached to the mount;
   a color wheel fixedly attached to the motor, the color wheel having a spiral color filter with a filter edge;
   a light integrator rod having an input face and an output face proximate to the color wheel; and
   an alignment mechanism configured to move the motor with respect to the light integrator rod in a first direction and in a second direction to align the filter edge with respect to the output face of the light integrator rod.

2. The mount assembly of claim 1 wherein the filter edge is aligned to be tangential to the central axis of the light integrator rod.

3. The mount assembly of claim 1 wherein the filter edge is aligned so that the filter edge is tangential to an edge of the output face at a center of the edge.

4. The mount assembly of claim 1 wherein the alignment mechanism includes a sliding plate and a reduction ramp, the sliding plate moving along the reduction ramp a first distance in the first direction to move the motor a second distance in the second direction, the first distance being greater than the second direction.

5. The mount assembly of claim 1 wherein the alignment mechanism includes a tab on a back plate of the motor, the alignment tab cooperating with a tapered end of an alignment screw to move the motor with respect to the integrator rod when the alignment screw is extended.

6. The mount assembly of claim 1 wherein the alignment mechanism is configured to provide at least 1.5 mm of travel in the first direction with an alignment accuracy of at least 0.01 mm, and to provide at least 1.5 mm of travel in the second direction with an alignment accuracy of at least 0.01 mm, wherein the first direction is orthogonal to the second direction.

7. The mount assembly of claim 1 further comprising an aperture plate attached to the input face of the integrator rod, the aperture plate supporting the integrator rod in the mount assembly in a cantilever fashion from the aperture plate.

8. The mount assembly of claim 7 further comprising a cover extending along the integrator rod, the aperture plate sealing an input end of the cover from dust intrusion.

9. The mount assembly of claim 8 further comprising a plurality of alignment rods extending through the cover to contact the light integrator rod.

10. The mount assembly of claim 9 wherein the plurality of alignment rods contact the light integrator rod less than half-way from the input face to the output face, an unsupported portion of the light integrator rod extending from the plurality of alignment rods toward the output face.

11. The mount assembly of claim 9 wherein at least one of the plurality of alignment rods has an end shaped to provide a line contact with a wall of the light integrator rod.

12. The mount assembly of claim 11 wherein the end is countersunk.

13. The mount assembly of claim 7 further comprising a plate attached to the output face of the integrator rod, the integrator rod being supported by the plate and by the aperture plate.

14. The mount assembly of claim 1 further comprising a plate attached to the output face of the integrator rod, the plate supporting the integrator rod in the mount assembly in a cantilever fashion from the plate.

15. The mount assembly of claim 7 further comprising a cone extending from the input end of the aperture plate.

16. The mount assembly of claim 15 wherein the cone has a cone angle selected according to an angle of light from a lamp.

17. The mount assembly of claim 15 further comprising a filter attached to the cone to keep dust from landing on the aperture plate.

18. The mount assembly of claim 17 wherein the filter comprises at least one of an infrared filter and an ultraviolet filter.

19. A mount assembly comprising:
    a mount;
    a motor;
    a color wheel fixedly attached to the motor, the color wheel having a spiral color filter with a filter edge;
    a light integrator rod having an input face and an output face proximate to the color wheel;
    a cover extending along the integrator rod from the input face toward the output face; and
    a plate attached to the input face of the light integrator rod supporting the light integrator rod in a cantilever fashion within the cover and sealing a first end of the cover from dust intrusion.

20. The mount assembly of claim 19 wherein the plate is an aperture plate.

21. The mount assembly of claim 19 wherein the motor is movably attached to the mount and further comprising an alignment mechanism configured to move the motor with respect to the light integrator rod along a first direction and a second direction to align the filter edge with respect to the output face of the light integrator rod.

22. The mount assembly of claim 19 further comprising a cone extending from the input face away from the light integrator rod, the cone having a cone angle selected to shadow the motor from light from a lamp.

23. The mount assembly of claim 19 further comprising a cone extending from the input face away from the light integrator rod and a filter attached to a wide end of the cone.

24. A method of aligning a scrolling color light system comprising:
    adjustably attaching a motor mount having a motor with a scrolling color wheel to a light integrator mount supporting a light rod;
    aligning the light rod to an optical axis of a light source; and
    aligning an output face of the light rod to the scrolling color wheel without changing the alignment of the light rod with respect to the optical axis of the light source.

25. The method of claim 24 further comprising steps of:
    aligning a timing light sensor to a timing mark on the scrolling color wheel; and
    securing the timing light sensor to the motor mount.

26. The method of claim 25 wherein the step of aligning the timing light sensor occurs before the step of aligning the output face.

* * * * *